(12) United States Patent
Sugiyama et al.

(10) Patent No.: US 6,934,043 B1
(45) Date of Patent: Aug. 23, 2005

(54) PRINTER AND RECORDING MATERIAL FOR THE SAME

(75) Inventors: Naoshi Sugiyama, Saitama (JP); Motoshige Asano, Saitama (JP); Toshiaki Fujimaki, Saitama (JP); Kazuo Miyaji, Saitama (JP); Ryo Imai, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/373,589

(22) Filed: Aug. 13, 1999

(30) Foreign Application Priority Data

Aug. 17, 1998 (JP) .............................. 10-230972

(51) Int. Cl.⁷ ............................................ G06F 15/00
(52) U.S. Cl. ..................... 358/1.15; 358/296; 358/448
(58) Field of Search ............................. 358/1.15, 448, 358/296; 399/45, 389; 347/101, 105–107; 235/375, 376, 381; 283/72, 74, 117; 412/8, 412/33

(56) References Cited

U.S. PATENT DOCUMENTS

| | | | | |
|---|---|---|---|---|
| 4,782,221 A | * | 11/1988 | Brass et al. ................. | 235/494 |
| 5,053,814 A | * | 10/1991 | Takano et al. ................ | 399/23 |
| 5,816,165 A | * | 10/1998 | Huston ........................ | 101/490 |
| 6,246,776 B1 | * | 6/2001 | Merz et al. ................. | 382/100 |
| 6,335,084 B1 | * | 1/2002 | Biegelsen et al. .......... | 428/192 |

* cited by examiner

Primary Examiner—Twyler Lamb
(74) Attorney, Agent, or Firm—Sughrue Mion, PLLC

(57) ABSTRACT

A thermal printer is used with a thermosensitive recording sheet, and records an image on the recording sheet. A predetermined discernment code is provided for the recording sheet. A code reader inputs the predetermined discernment code. A system control block stores reference code, and checks the predetermined discernment code with reference to the reference code to judge whether the recording sheet is acceptable or unacceptable. If the recording sheet is unacceptable, printing operation is inhibited and/or an alarm signal is generated.

40 Claims, 10 Drawing Sheets

F I G. 3B
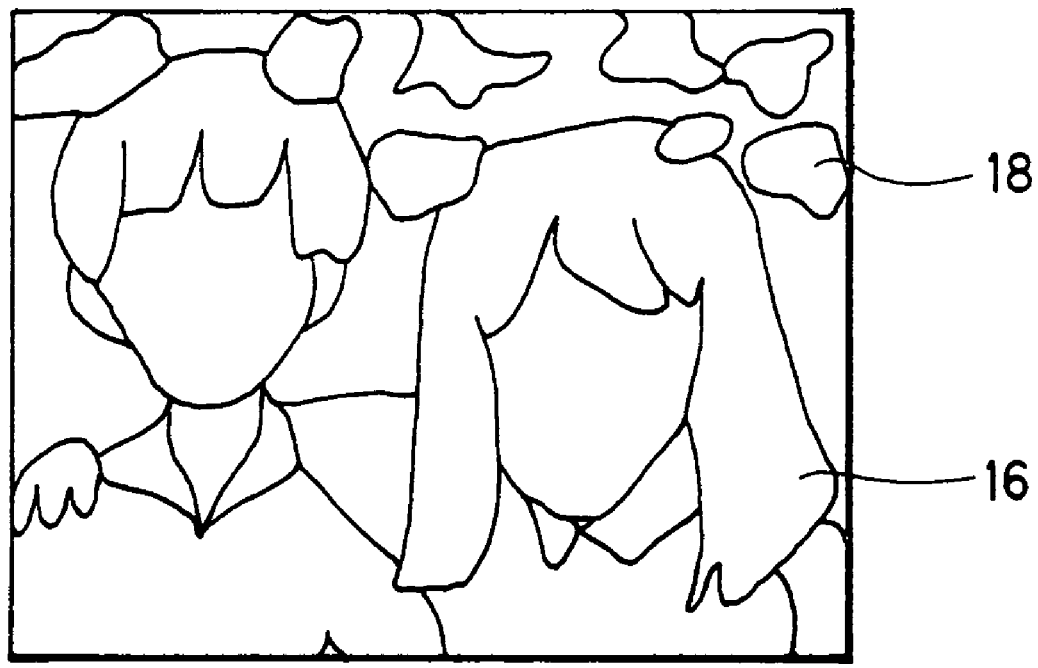

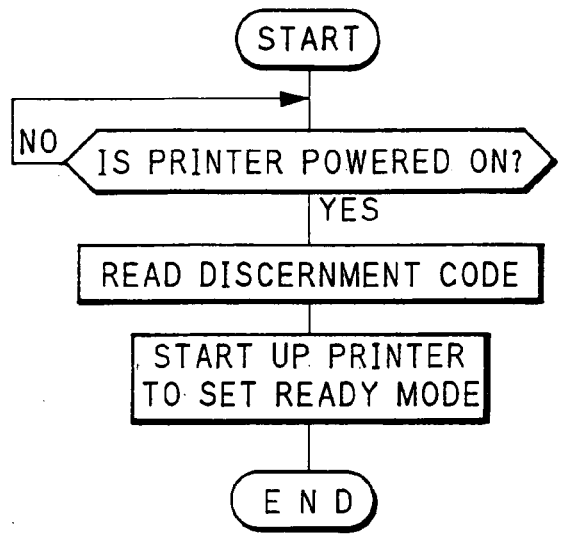
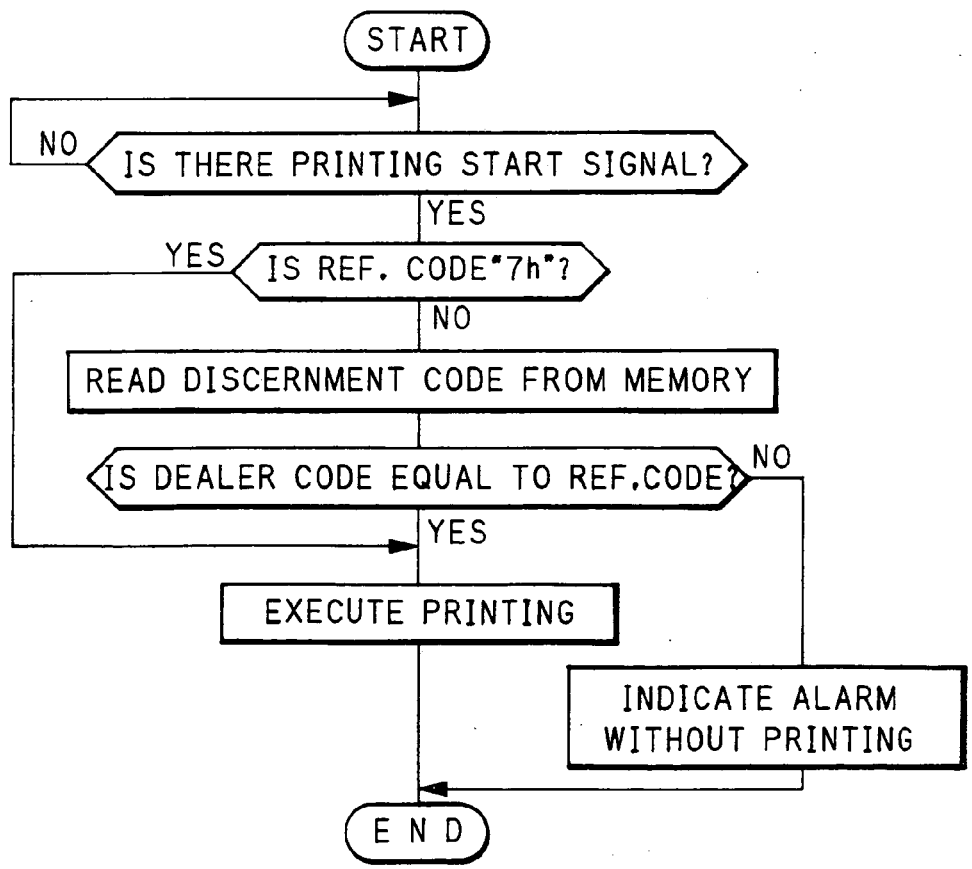

F I G. 12
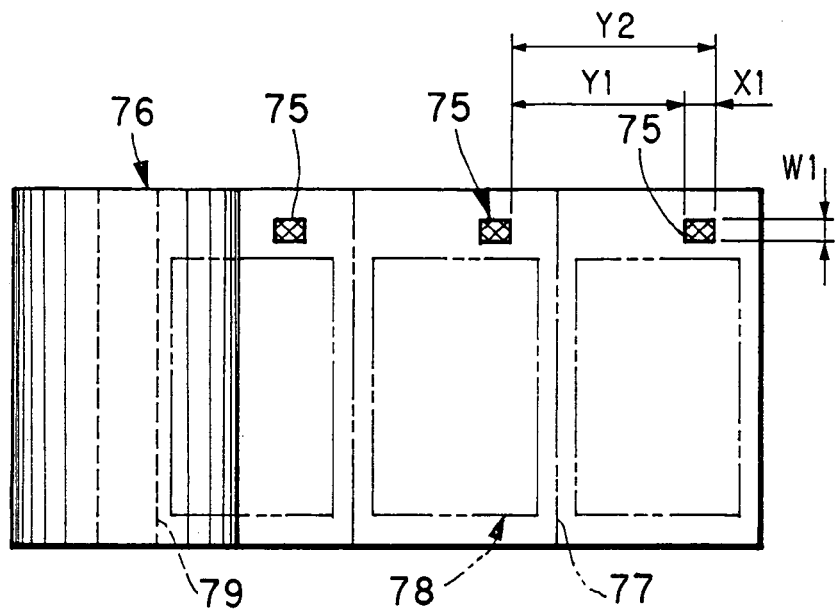
F I G. 14
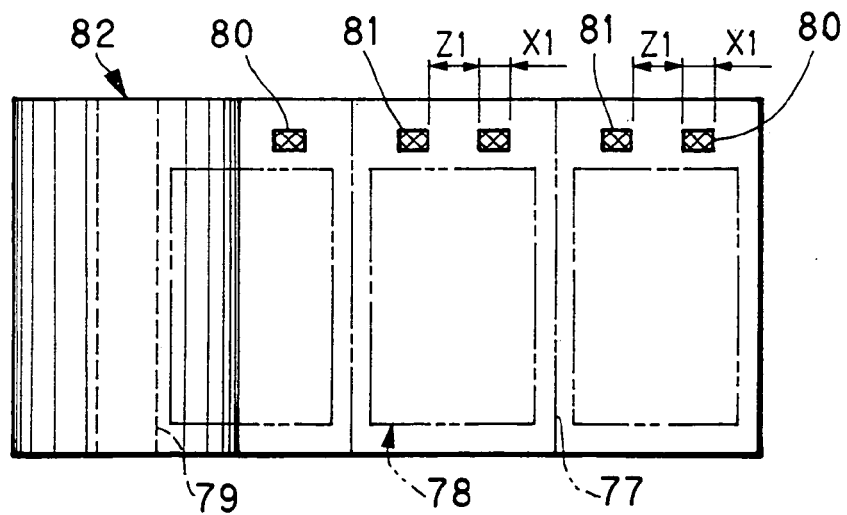

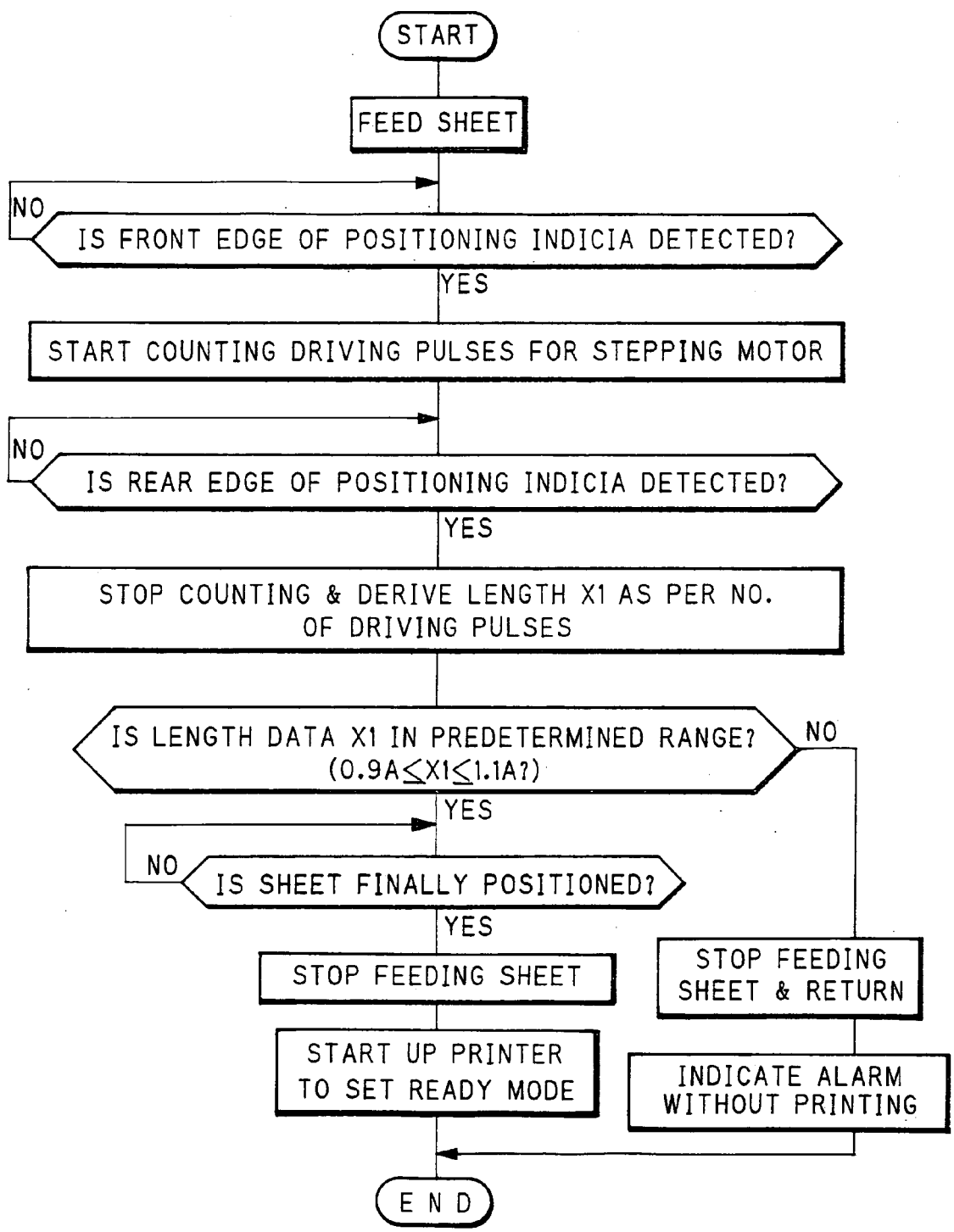

PRINTER AND RECORDING MATERIAL FOR THE SAME

BACKGROUND OF THE INVENTION

1. Field of the Invention

The present invention relates to a printer and recording material for the same. More particularly, the present invention relates to a printer and recording material for the same, in which a photographed image such as a portrait image can be printed without lowering image quality.

2. Description Related to the Prior Art

There is a printer known with a trade name of "Print Club", which is an automatic portrait producing machine including a pick-up camera for picking up an object to obtain data of an object image or a portrait image. A frame memory stores the data of the object image. A printing head, such as a thermal head, prints the object image to recording material to produce a print sheet. Also a decorative pattern image or other additional images are stored in the printer, and combined with the object image to be printed.

In the printer, problems are likely to arise if a recording material to be used does not satisfy predetermined conditions. The printer may be broken if a size or thickness of the recording material is different. Or desired quality of the image cannot be obtained. Thermosensitive recording material as an example of a recording material includes a base sheet material and cyan, magenta and yellow coloring layers having such a feature that its coloring characteristic changes due to a condition of preservation. Also, problems in the degradation in the quality arise with other various types of recording material, such as heat-development transfer type or sublimation thermal transfer type. The preserving conditions also depends upon the distribution channel of the recording material. But there is no known technique which allows selection of recording material with distribution channel which does not influence the quality of the recording material.

SUMMARY OF THE INVENTION

In view of the foregoing problems, an object of the present invention is to provide a printer and recording material for the same, in which a photographed image such as a portrait image can be printed without such problems as degradation in the printed image or breakage of the printer.

In order to achieve the above and other objects and advantages of this invention, a printer, for recording an image on recording material, includes a first input unit for inputting predetermined discernment information therewith, the predetermined discernment information being provided for the recording material. A discriminator stores reference information, and checks the predetermined discernment information with reference to the reference information to judge whether the recording material is acceptable or unacceptable, wherein if the recording material is unacceptable, printing operation is inhibited and/or an alarm signal is generated.

Furthermore, a pick-up unit picks up an object to obtain information of an object image. A frame memory stores the information of the object image. A printing head prints the object image to the recording material according to the information.

The predetermined discernment information is indicated in an externally readable manner and provided on the recording material. The first input unit comprises an information reader for reading the predetermined discernment information.

Furthermore, a second input unit inputs the reference information therewith.

The recording material includes a printing surface and a back surface, and the predetermined discernment information is disposed on the back surface.

In a preferred embodiment, the recording material includes a printing surface and a back surface, the printing surface has an effective printing region and a peripheral region defined thereabout, and the predetermined discernment information is disposed in the peripheral region. Furthermore, a cutter cuts away the peripheral region at least partially from the recording material after the printing operation, to eliminate the predetermined discernment information.

In another preferred embodiment, the recording material is wound in a roll form to constitute a roll recording material. The roll recording material includes a reel disposed at a center of the roll form of the recording material, the predetermined discernment information being indicated on the reel.

The predetermined discernment information comprises a code for representing at least one of a recording material type, a recording material printing format, a recording material size and a recording material dealer of the recording material.

In a preferred embodiment, the predetermined discernment information comprises a code of which at least one portion represents a recording material distribution channel of the recording material.

The predetermined discernment information is a binary code including plural bits.

Furthermore, an auxiliary image memory stores information of predetermined auxiliary image. An image synthesis circuit produces synthesized image information by combining the information of the object image with the information of the auxiliary image, the printing head printing the object image and the auxiliary image combined therewith to the recording material according to the synthesized image information.

The predetermined discernment information is constituted by a positioning indicia disposed on the recording material in a predetermined position, and adapted to recording material positioning for printing.

The predetermined discernment information is constituted by at least one of a length, a width, a shape and a pitch of the positioning indicia.

In a preferred embodiment, the recording material includes a positioning indicia prerecorded thereon and adapted to recording material positioning for printing. An auxiliary indicia is prerecorded at a predetermined distance from the positioning indicia in a feeding direction of the recording material, the predetermined distance constituting the predetermined discernment information. The first input unit includes a length measurer for measuring the predetermined distance.

The length measurer includes a recording material feeder, driven in response to a driving pulse, for conveying the recording material. An indicia sensor detects the positioning indicia and the auxiliary indicia. A pulse counter counts the driving pulse between detection of the positioning indicia and detection of the auxiliary indicia to obtain the predetermined distance.

In another preferred embodiment, the first input unit is externally operable, and the predetermined discernment information is input upon operation thereof.

According to another aspect of the present invention, a recording material includes a printing surface and a back surface. A predetermined discernment information is prerecorded on the printing surface or the back surface readably.

BRIEF DESCRIPTION OF THE DRAWINGS

The above objects and advantages of the present invention will become more apparent from the following detailed description when read in connection with the accompanying drawings, in which:

FIG. 3B is an explanatory view illustrating a frame provided with a principal image and an auxiliary image;

FIG. 4 is a flow chart illustrating a routine at the time of powering;

FIG. 5 is a flow chart illustrating a printing routine including steps of checking a discernment code;

FIG. 12 is a plan illustrating still another preferred roll of continuous thermosensitive recording sheet with positioning indicia;

FIG. 13 is a flow chart illustrating a routine of positioning the recording sheet of FIG. 12 and including a code checking step; and FIG. 14 is a plan illustrating a further preferred roll of continuous thermosensitive recording sheet with positioning indicia and auxiliary indicia.

DETAILED DESCRIPTION OF THE PREFERRED EMBODIMENT(S)OF THE PRESENT INVENTION

Figure 1:
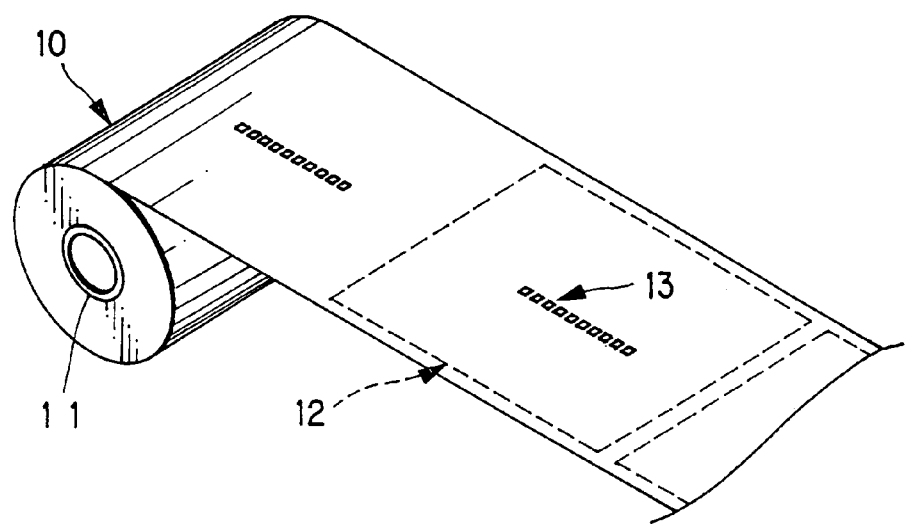
FIG. 1 is a perspective illustrating a roll of continuous thermosensitive recording sheet.

In FIG. 1, a continuous recording sheet 10 as a recording material is wound about a reel 11. A predetermined discernment code 13 is printed on a back surface of the continuous recording sheet 10, and associated with each of printing regions 12 arranged in one train. The discernment code 13 is recorded also for the purpose of positioning of the printing regions 12. According to a feeding amount of the continuous recording sheet 10 and a time point of detecting the discernment code 13, a starting position of the printing regions 12 is detected exactly.

Figure 2:
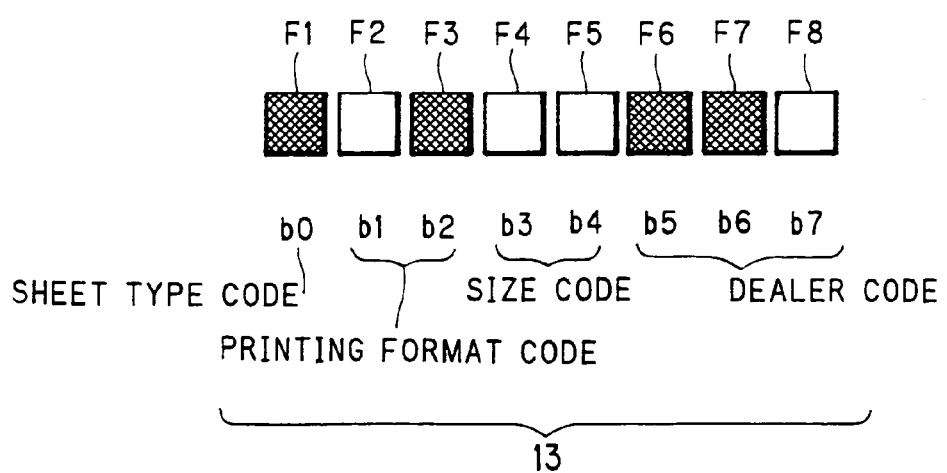
FIG. 2 is an explanatory view illustrating a predetermined discernment code.

In FIG. 2, the discernment code 13 is an 8-bit code including eight quadrilateral regions F1–F8, either dark color or blank, to represent eight bits b0, b1, . . . , b7. The bit b0 at the first region F1 constitutes a recording material type code. The recording material type code is either one of a simple thermosensitive sheet or a sticker sheet with thermosensitive layers. If the region F1 is blank or white, then the bit b0 is zero (0), to represent the simple thermosensitive sheet. If the region F1 is dark color or black, then the bit b0 is one (1), to represent the sticker sheet.

The bits b1 and b2 at the regions F2 and F3 constitute a printing format code, which represents the multi-frame printing in which one common image is printed in plural regions arranged in a matrix on each single sheet, for example 4-region, 8-region, 16-region printing.

The bits b3 and b4 at the regions F4 and F5 constitute a recording material size code, which represents the size of the recording sheet. A combination (0, 0) for the bits b3 and b4 represents the continuous form of the A5 format. A combination (0, 1) represents the continuous form of the A6 format. A combination (1, 0) represents the single cut sheet form of the A5 format. A combination (1, 1) represents the single cut sheet form of the A6 format.

The bits b5, b6 and b7 at the regions F6, F7 and F8 constitute a recording material dealer code. The dealer code can have seven values of "0h" to "6h", which represent seven dealers. A value "7h" is defined as an almighty code, which is not recorded to the continuous recording sheet. The almighty code is defined for use in the printer. If the dealer code in a reference code determined in the printer is "7h" as almighty code, then the continuous recording sheet is forcibly allowed for being used in printing in a manner irrespective of any particular dealer that the dealer code in the discernment code designates.

The continuous recording sheet 10 is color thermosensitive recording sheet known in the art, and includes a base sheet material, cyan, magenta and yellow coloring layers, and a protective layer overlaid sequentially. Among those, the cyan coloring layer is disposed in the deepest position, has the lowest heat sensitivity, and colored in the cyan color upon application of relatively great heat energy. The magenta coloring layer is colored in the magenta color upon application of medium heat energy. The yellow coloring layer is disposed the farthest from the base sheet material, has the highest heat sensitivity, and colored in the yellow color upon application of relatively small heat energy.

There are intermediate layers disposed between the coloring layers for adjusting their heat sensitivity. A back layer is disposed on a back surface of the base material. It is possible to use different recording material in which the layered positions of the coloring layers are differently determined. The heat sensitivity of each of the coloring layers depends on the depth of the layers with reference to the printing surface of the recording sheet, and does not depend on the chemical characteristic of the layers. Thus the heat sensitivity of the coloring layers is the lower according to the deep extent of the coloring layers. The protective layer is a transparent resin layer produced mainly from polyvinyl alcohol (PVA), and protects the coloring layers from being scratched or damaged.

The yellow and magenta coloring layers have optical fixability, with which the colorability of those layers is destroyed upon application of electromagnetic rays so as to prevent their further coloring. The magenta coloring layer has the maximum absorption wavelength of approximately 365 nm. When the magenta coloring layer receives ultraviolet rays of this wavelength range, the magenta colorability is destroyed. The yellow coloring layer has the maximum absorption wavelength of approximately 420 nm. When the yellow coloring layer receives ultraviolet rays of this wavelength range, the yellow colorability is destroyed.

Figure 3A:
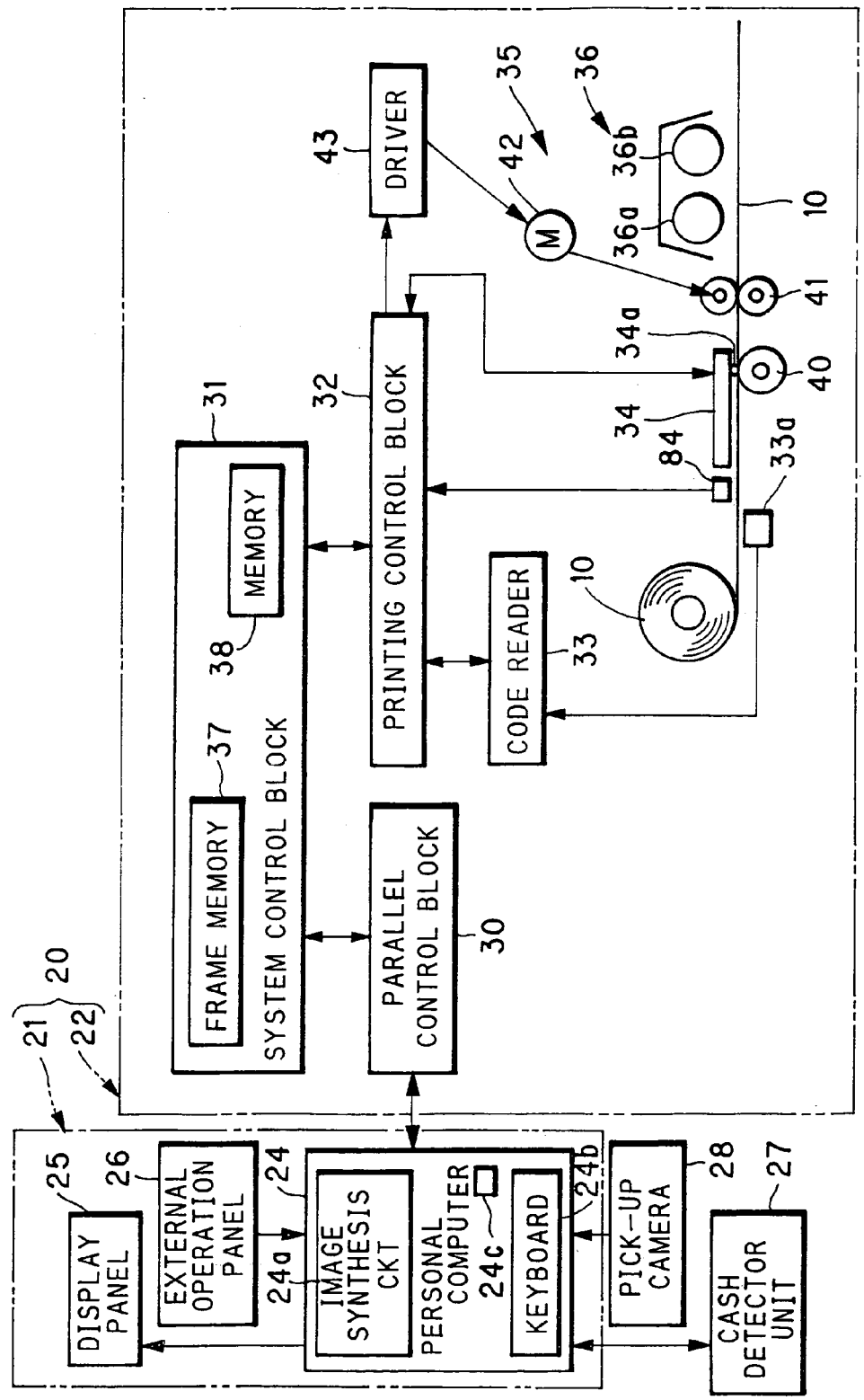
FIG. 3A is a schematic diagram illustrating a thermal printer.

In FIG. 3A, a thermal printer 20 is schematically depicted as automatic portrait producing machine. The thermal printer 20 is constituted by a host computer 21 and a thermal printer unit 22. The host computer 21 consists of a personal computer 24, and includes a keyboard 24b as an input unit, a display panel 25 and an external operation panel 26. The keyboard 24b is covered by a lid (not shown), which does not allow access to the keyboard 24b when closed, but can be opened for allowing external operation of the keyboard 24b.

There is a cash detector unit 27 and a pick-up camera 28 connected to the host computer 21. The cash detector unit 27 receives insertion of cash, counts the cash as inserted, and also pays out coins to be returned to a customer. The pick-up camera 28 photographs a body of the customer standing in front of the printer in a manner of a portrait. The host computer 21 controls sequential operation including the insertion of the cash and the ejection of print sheets. Upon insertion of the cash, a menu is indicated on the display panel 25. The customer operates the external operation panel 26 according to the menu, selects images to be combined, such as a background image, a foreground image, character images and decorative images, all as additional images 18. See FIG. 3B. The body of the customer being picked up, an image synthesis circuit 24a produces information of a synthesized image to be printed.

Note that an auxiliary image memory 24c is used for storing any of the additional images 18 to be combined with a principal image 16 of FIG. 3B picked up from the body of the customer.

The printer unit 22 is constituted by various elements including a parallel control block 30, a system control block 31 as an discriminator, a printing control block 32 or a pulse counter, a code reader 33 as an input unit, a thermal head 34 as a printing head, a sheet feeder 35, and an optical fixer unit 36. There is a platen roller 40, against which a heating element array 34a of the thermal head 34 presses the continuous recording sheet 10. The sheet feeder 35 includes feeder rollers 41, a motor 42 for rotating the feeder rollers 41, and a driver 43 for driving the motor 42.

The parallel control block 30 receives data from the host computer 21 including the image data and a printing start command signal, and transfers them to the system control block 31. Also the parallel control block 30 transfers various status signals of the printer unit 22 to the host computer 21.

A frame memory 37 is included in the system control block 31, and stores image data received from the host computer 21. The system control block 31 controls the overall operation of the printer unit 22. The printing control block 32 controls the thermal head 34 at the time of execution of printing, effects the image-processing, and controls the conveyance of the recording sheet.

In FIG. 4, the host computer 21, when powered, sends a command signal to the printer unit 22 for reading of the discernment code. In response to this, the code reader 33 is instructed to read the code by sending the command signal from the host computer 21 to the parallel control block 30, the system control block 31 and the printing control block 32 in the printer unit 22. The code reader 33 has a photo sensor 33a or a recording material sensor, which optically reads the discernment code, and encodes the same. The predetermined discernment code as read is transferred to the system control block 31, and written to a memory 38. The code is kept stored in the memory 38 before the powering off of the printer.

Subsequently the host computer 21 effects a start-up operation, and sets the various elements in a ready mode, to stand by for awaiting customers. In the ready mode, the printing sequence and printed samples are indicated sequentially on the display panel. A customer inserts cash or coins of a predetermined amount into the cash detector unit 27, so that the host computer 21 is set to a pick-up mode. In the pick-up mode, the display panel 25 is caused to indicate a sequence of picking up images to be printed and a sequence of image synthesis. The external operation panel 26 is operated by the customer according to the indications, to cause the pick-up and image synthesis. The synthesized image is displayed, and confirmed by the customer's operation at the external operation panel 26. Then the host computer 21 is set in a printing mode. In the printing mode, the host computer 21 transfers a printing command signal and data of an image to be printed to the printer unit 22.

When the host computer 21 is set in a printing mode, the system control block 31 is controlled by the host computer 21 according to the parallel control, receives the image data, executes the reading of the discernment code, checks the discernment code with reference to the reference code, and starts printing.

A reference code is sent by the host computer 21 via the parallel control block 30 to the system control block 31 for the purpose of a printing command and recording material discernment. In FIG. 5, the system control block 31 checks whether the reference code from the host computer 21 has a value of "7h". If so, then the system control block 31 executes the printing operation. Thus the printer unit 22 can be allowed to print in a manner irrespective of the type of the continuous recording sheet. Note that, if "7h" is initially desired for the reference code to be used, "7h" is input by use of the keyboard 24b.

If the reference code is not "7h", then the discernment code is read from the memory 38. A recording material dealer code included in the discernment code is obtained, and checked as to whether it coincides with the recording material dealer code in the reference code. If there is coincidence, then the system control block 31 sends a printing command signal to the printing control block 32, and transfers the image data required for being printed. Also the recording material type code, the recording material size code, the printing format code and the like in the discernment code are checked in a manner as to whether the continuous recording sheet 10 satisfies conditions suitable to be used in the printer unit 22. If each of those codes coincide with a relevant part of the reference code, then the printing operation is started. The discernment code of the continuous recording sheet 10 to be used in the printer unit 22 is previously input in the personal computer 24, so that the continuous recording sheet 10 having the coincidence in the discernment code is allowed for use in the printing. The continuous recording sheet 10 supplied by any dealer different from the particular dealer is rejected. Thus the quality in the printing is ensured, as the continuous recording sheet 10 that is different from the standard continuous recording sheet or has been preserved under an unwanted condition is not used.

In the transfer of the image data, the image data transferred from the host computer 21 is treated in the parallel control block 30, and written to the frame memory 37 in the system control block 31.

The printing control block 32 operates for image processing according to a printing command signal from the system control block 31, and transfers one-line yellow image data to the thermal head 34 from the image data after being processed, so as to drive each of the heating elements in the thermal head 34. Also the printing control block 32 causes the sheet feeder 35 to convey the continuous recording sheet 10 by one line in synchronism with the driving of the thermal head 34. The yellow image is recorded to the printing region 12 in the continuous recording sheet 10 one line after another. See FIG. 1. Lines are similarly recorded one after another. After the yellow recording, the magenta and cyan are recorded, so that a full-color image is produced by the three-color frame-sequential recording. A yellow fixer lamp 36a in the fixer unit 36 is turned on immediately after the yellow recording, to fix the yellow coloring layer. A magenta fixer lamp 36b is turned on immediately after the magenta recording, to fix the magenta coloring layer. Note that, in the present embodiment, the thermal head 34 being single is used, and the continuous recording sheet 10 is conveyed back and forth. Furthermore, it is possible to record an image by the three-head one-pass recording, in which three thermal heads are used and the continuous recording sheet 10 is conveyed in one direction for one time.

If the dealer code included in the discernment code does not coincide with that included in the reference code, the system control block 31 transfers non-coincidence data to the host computer 21 without effecting the printing operation. Also for the recording material dealer code, the recording material type code, the recording material size code and the printing format code, coincidence is evaluated. The system control block 31, when there is no coincidence, transfers data of non-coincidence to the host computer 21. Then the host computer 21 causes the display panel 25 to indicate a printing disabled state due to the unacceptability of the continuous recording sheet 10, and an alarm to call an attendant or operator. Also the host computer 21 causes a buzzer or a sound generator to generate an alarm sound. In the case where the cash has been inserted, the host computer 21 causes the cash detector unit 27 to pay back the cash to the customer without receipt.

Figure 6:
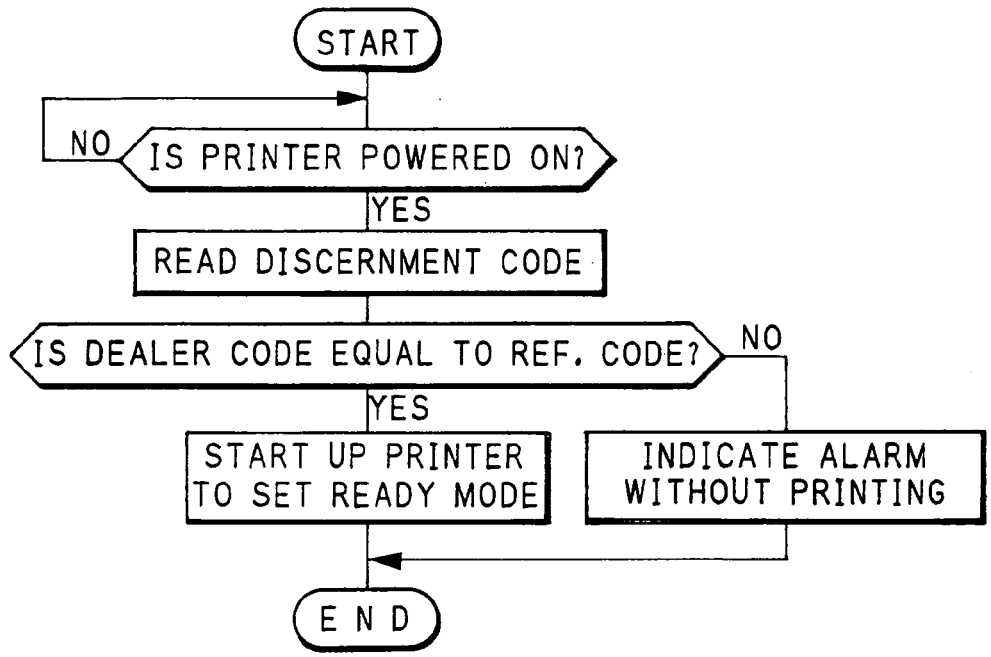
FIG. 6 is a flow chart illustrating another preferred embodiment in which the discernment code is checked upon a start of printing.

In FIG. 6, another preferred embodiment is illustrated, in which the discernment code is read upon powering of the printer, to check coincidence of the discernment code with the reference code previously written. If there is no coincidence, then an alarm signal is generated in a visible manner to inform unacceptability of the continuous recording sheet 10. Also the printing is inhibited. The alarm sound is generated for alarm to instruct an attendant or operator to insert acceptable continuous recording sheet. If there is coincidence, then the initial starting operation of the printer is executed, to set a ready mode in which the printer stands by for customers. In the ready mode, cash is insertable for pick-up of images, image synthesis, and printing.

Figure 7:
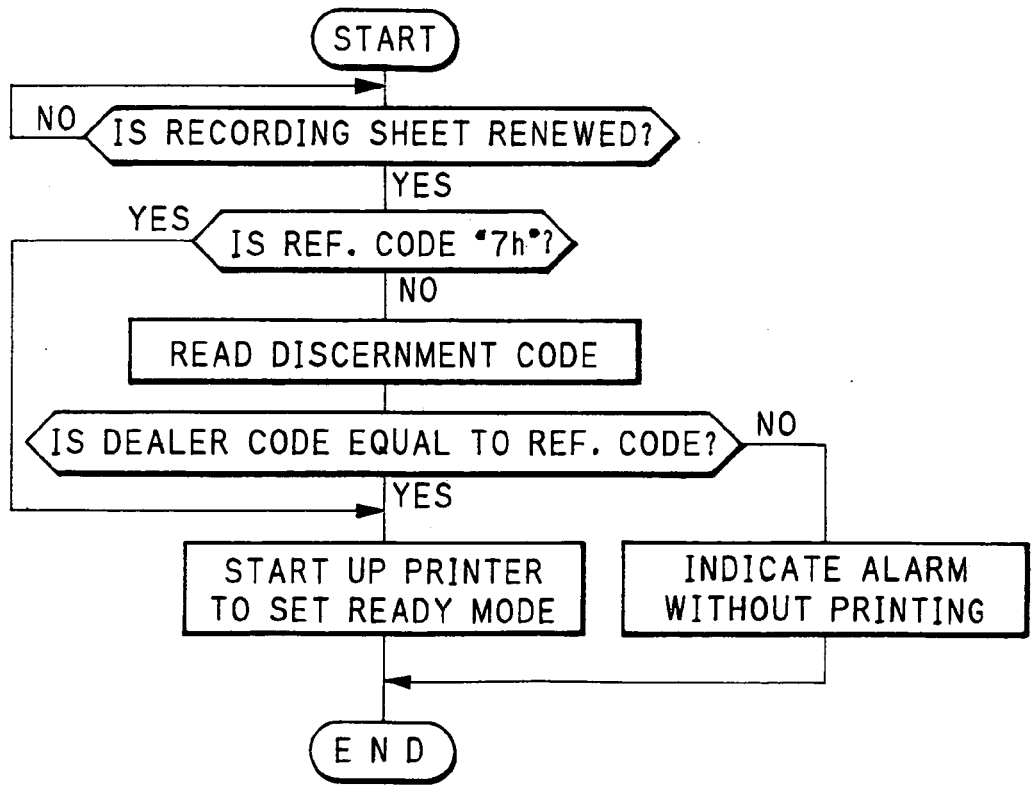
FIG. 7 is a flow chart illustrating still another preferred embodiment in which the discernment code is checked upon renewal of continuous recording sheet.

In FIG. 7, a further preferred embodiment is illustrated, in which the discernment code is read and checked immediately after the renewal of the continuous recording sheet. The printing can be inhibited if the discernment code does not coincides with the reference code. If the reference code has the value "7h" of the almighty code, then the printing is allowed without reading the discernment code. Note that, in FIG. 6, it is possible to add a step for checking whether the reference code has the value "7h" of the almighty code.

In the above embodiments, the discernment code read by the code reader 33 is stored to the memory 38 at first, and read from the memory 38 at each time of printing, for the purpose of checking it with the reference code. Alternatively it is possible to read the discernment code at each time of printing.

In the above embodiments, the system control block 31 in the printer unit 22 checks coincidence of the codes. Also the host computer 21 may operate for checking the coincidence of the discernment code with the reference code. For this operation, the discernment code being read is transferred from the printer unit 22 to the host computer 21 in a data form. The printer unit 22 does not operate for the checking of the coincidence, so that the load to the printer unit 22 can be reduced. The degree of freedom in applications on the side of the host computer 21 can be high.

In the above embodiments, the reference code is stored in the host computer 21. Also, it is possible to use a non-volatile memory in the printer unit 22, for example in the system control block 31. At the time of shipment from a factory, it is possible to write the reference code into the non-volatile memory to be used in the printer unit 22. For such a case, either one of the printer unit 22 and the host computer 21 checks coincidence of the detected discernment code with the reference code. Note that not only one reference code but plural reference codes may be stored in the non-volatile memory. With such plural codes, printing may be allowed when the detected discernment code coincides with any one of the reference codes. Otherwise the printing is inhibited. Furthermore it is possible to, if the host computer 21 stores the reference code, store a plurality of reference codes in the host computer 21.

Figure 8:
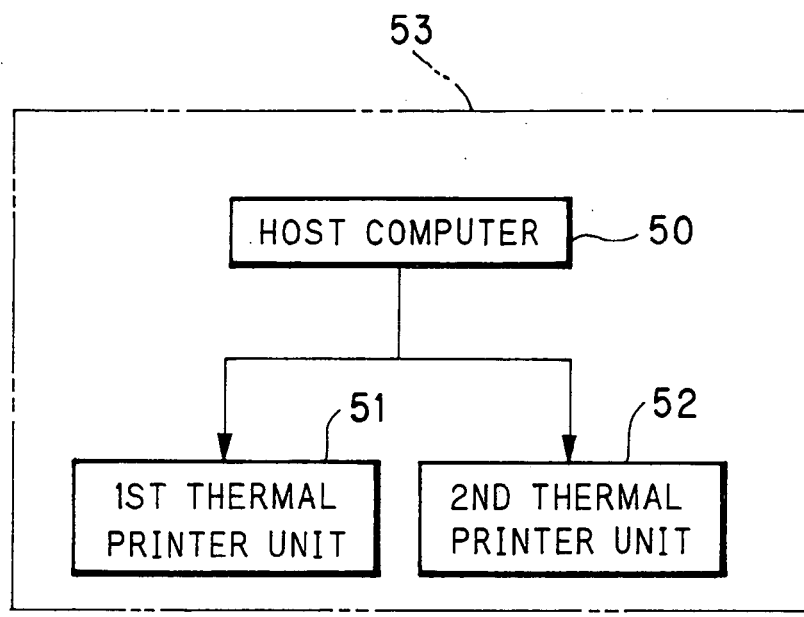
FIG. 8 is a block diagram illustrating a preferred embodiment having two printer units.

The above embodiments have the one host computer 21 and the one thermal printer unit 22. In FIG. 8, another preferred thermal printer 53 is constituted by one host computer 50 and two thermal printer units 51 and 52, and is operable as a multi-paper type. The printer unit 51 is used for printing with a simple thermosensitive sheet in a continuous form. The printer unit 52 is used for printing with a sticker sheet in a continuous form with thermosensitive layers. Each of the printer units 51 and 52 is allowed to operate only when acceptable recording material is set therein. Note that it is possible to construct a printer with three or more printer units.

Figure 9:
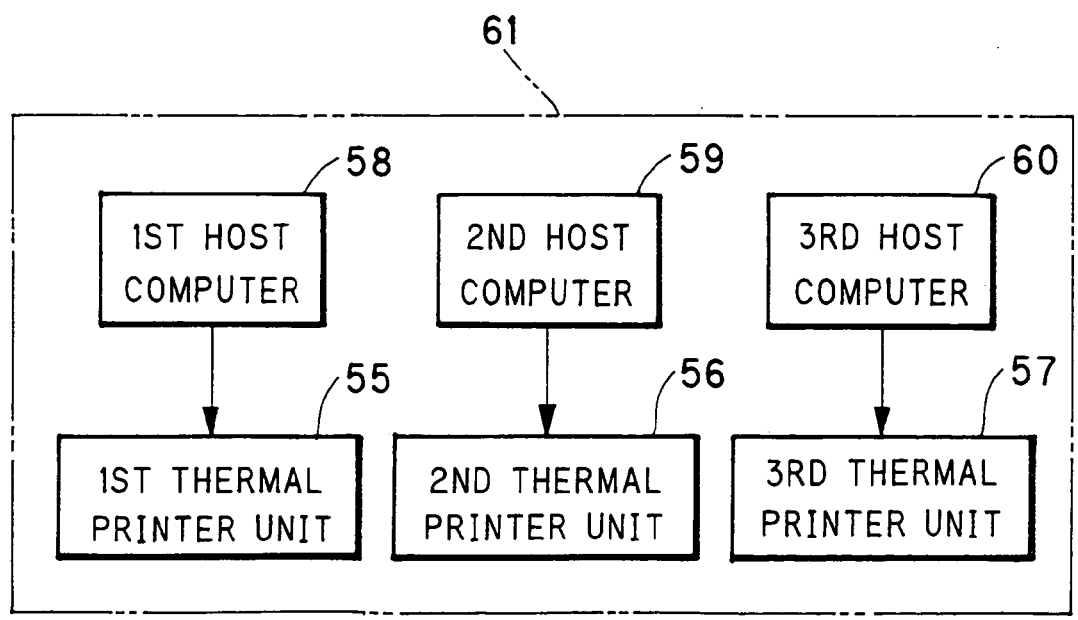
FIG. 9 is a block diagram illustrating a preferred embodiment having three printer units and three host computers.

In FIG. 9, a preferred embodiment is illustrated, in which three host computers 58, 59 and 60 are used in connection respectively with thermal printer units 55, 56 and 57, so as to constitute a thermal printer 61 in a multi-paper manner. Only one of the plural continuous recording sheets is designated for printing by use of one of the host computers 58, 59 and 60 and one of the printer units 55, 56 and 57.

Figure 10:
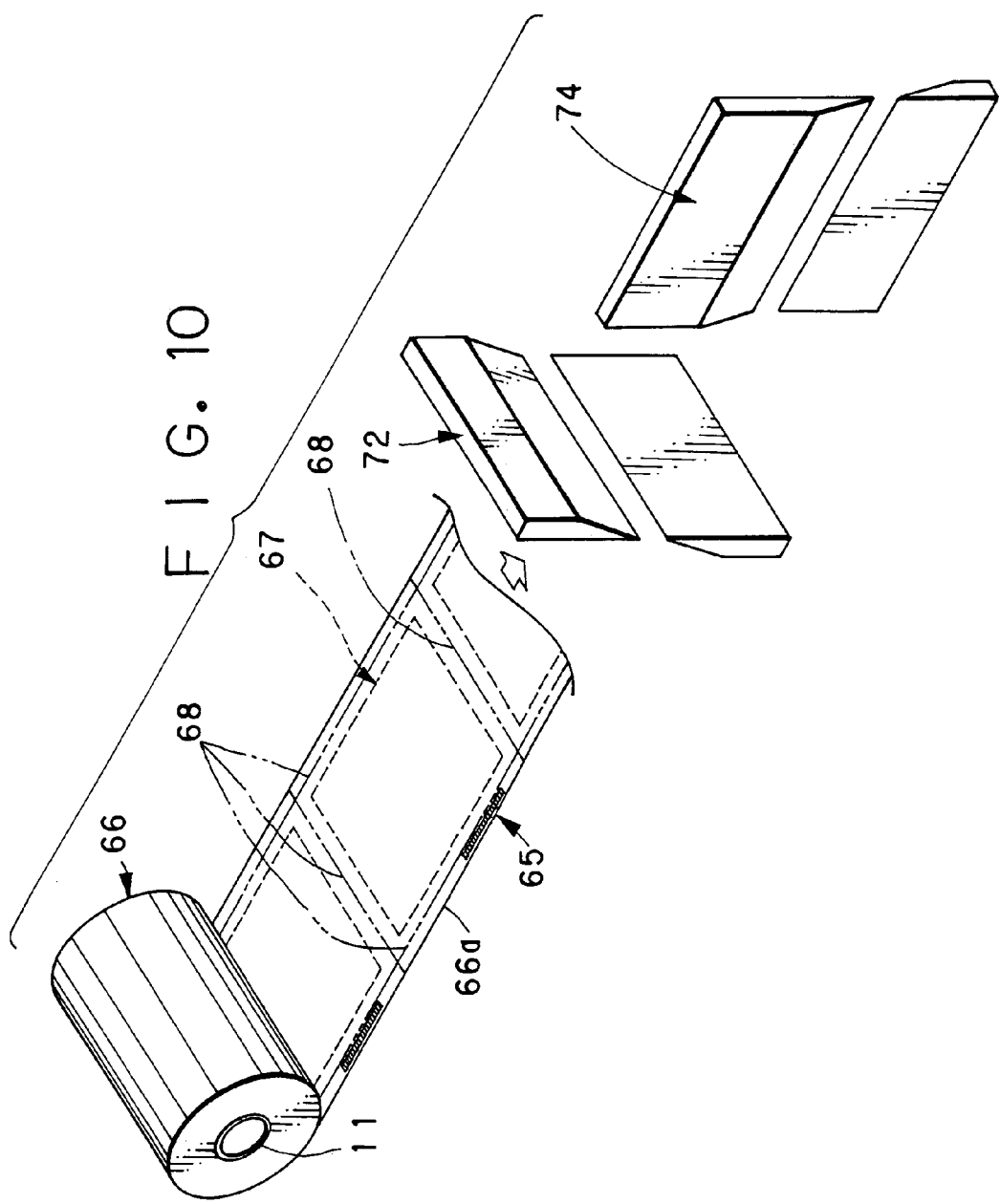
FIG. 10 is a perspective illustrating another preferred roll of continuous thermosensitive recording sheet together with cutters.

In the above embodiments, the discernment code 13 is disposed on the back surface of the continuous recording sheet 10. In FIG. 10, another preferred continuous recording sheet 66 as a recording material is illustrated. A predetermined discernment code 65 is printed on a printing surface of the continuous recording sheet 66, and in a peripheral region 66a outside an effective printing region 67. Virtual cutting lines 68 are also predetermined on the continuous recording sheet 66. After the printing operation, the peripheral region 66a with the discernment code 65 is cut away from the continuous recording sheet 66 by cutting along the virtual cutting lines 68. A print sheet can be obtained with an agreeable appearance, as the discernment code 65 is eliminated from the continuous recording sheet 66. Note that the discernment code 65 is disposed close to a longitudinally extending edge of the continuous recording sheet 66. Furthermore, it is possible to dispose a discernment code along a line which extends crosswise to the sheet feeding direction and will be an edge of each single sheet. Again, a small narrow portion having the discernment code can be cut off to provide the print sheet with good appearance.

In FIG. 10, a cutter 72 is illustrated, which cuts the continuous recording sheet 66 into single pieces of print sheets. A cutter 74 cuts the continuous recording sheet 66 along each one of the virtual cutting lines 68 extending in the sheet feeding direction. Note that there is one more cutter (not shown) similar to the cutter 74 and disposed opposite to the cutter 74.

In the present invention, the recording material may be pieces of recording sheets. The discernment codes 13 and 65 may have a form of a bar code, a CALRA code or other optically readable codes. The number of bits of the discernment code may be different from eight (8), and may be changed in a manner suitable for the form of the used code. Also it is possible to arrange a clock code in parallel with the discernment code. A signal generated upon reading the clock code may be used for controlling the timing of reading each of the bits of the discernment code.

It is also possible to construct the discernment code with an electrically conducting pattern. A thermal printer may be provided with a brush for contacting the conducting pattern, for detecting the discernment code from the recording material. Furthermore, discernment information of the recording material may be magnetic. The recording material can be provided with a magnetic recording layer, to which the discernment information may be written magnetically. Also, a predetermined set of holes or cutouts can be formed in the recording material in place of the quadrilateral regions F1–F8. The discernment code may be constituted by a permutation of the holes or cutouts selectively formed and arranged in one line.

Figure 11:
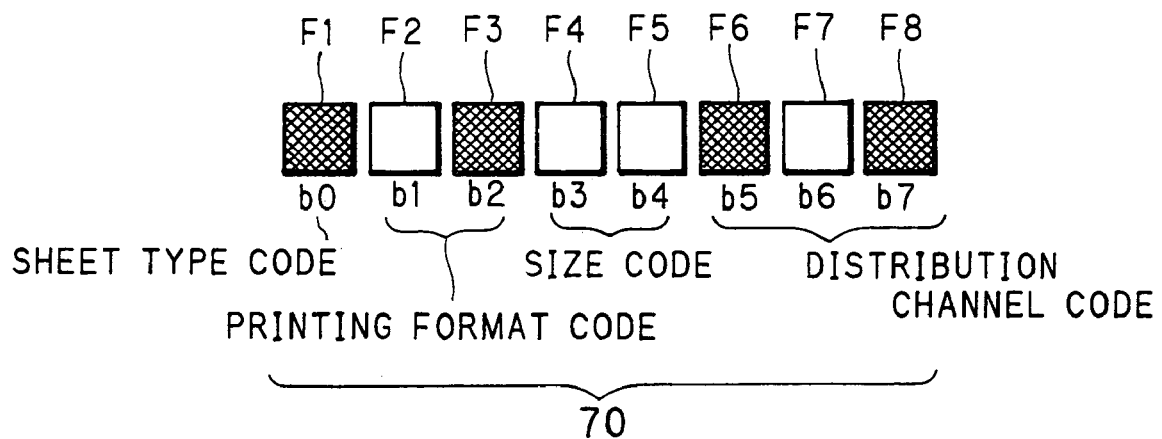
FIG. 11 is an explanatory view illustrating another preferred predetermined discernment code.

In the above embodiments, the discernment code 13 is a combination of the recording material dealer code, the recording material type code, the recording material size code and the printing format code. However the discernment code may consist of only the recording material dealer code without other codes. Furthermore, a predetermined discernment code 70 may include a distribution channel code as illustrated in FIG. 11 for discernment of a distribution channel or distribution route of the continuous recording sheet. Also the discernment code 13 may consist of only the distribution channel code without other codes. Although each of the various codes have bits as illustrated in FIGS. 2 and 11, the numbers of bits of each code may be changed suitably. Also, the sequence of arranging those various codes may be changed. Furthermore, the discernment code may be an identification code identifying the continuous recording sheet without discernment of the recording material dealer or the distribution channel.

Note that the distribution channel or distribution route of the recording material in the present embodiment means one of the wholesale dealer, the storehouse, the transportation agent and the transportation means, or other elements that treat the recording material in distribution from the manufacturer to the dealers, or combinations of any of those elements.

In the present invention, it is possible to check whether the dealer code of the recording material coincides with that included in the reference code without checking any of the recording material type code, the recording material size code or the printing format code. Furthermore, it is possible to check only one of the recording material type code, the recording material size code and the printing format code, to determine either allowance or inhibition of printing. Also, it is possible to check a combined code constituting at least two of the dealer code, the recording material type code, the recording material size code and the printing format code.

In the above embodiments, the recording material is a color recording sheet. Furthermore, the recording material in the present invention may be heat-development transfer type or sublimation thermal transfer type. Any recording material, of which quality is likely to change with time and due to a preserving condition, may be used in the present invention. The recording material may be a sheet for ink-jet printing, or photosensitive material of silver halide photography. For example, a self-processing photo film unit for use with an instant camera may be used.

In the above embodiments, the discernment code 13 is disposed directly on the continuous recording sheet 10. Also it is possible to dispose the discernment code 13 on any elements associated with the continuous recording sheet 10. Examples of such elements are a recording sheet cassette or a recording sheet package for containing the continuous recording sheet 10, axial ends of a recording sheet reel about which the continuous recording sheet 10 is wound in a roll form, and the like. In association with such elements, the printer is constructed to have a reader which reads the discernment code from a body of the cassette or package, or from the reel. In the above embodiments, the discernment code 13 is optically readable. Also, the discernment information may be data written to an IC memory.

In the above embodiments, the discernment code is read automatically. However it is possible to input the discernment code manually by operating the keyboard 24b of the personal computer 24 depicted in FIG. 3A at the time of setting the continuous recording sheet in the printer. The keyboard 24b is unlike the external operation panel 26, as the keyboard 24b is not externally accessible. A lid (not shown) of the printer must be opened for renewing the continuous recording sheet before the keyboard 24b can become operable. Also in this construction, the printing is allowed when the discernment code coincides with the reference code. If there is no coincidence, the printing is inhibited.

In the above embodiments, the discernment code 13 is prerecorded respectively with the printing region 12 at a predetermined pitch, and can be used also as a positioning indicia with which the printing region 12 is positioned. However the continuous recording sheet 10 may have only one discernment code prerecorded on a front end of the continuous recording sheet 10. See FIG. 1. Furthermore, the discernment code 13 may be disposed regularly at a certain pitch which is not related to the pitch of the printing region 12.

In the above embodiments, the printing is inhibited and an alarm signal is generated when the discernment code 13 does not coincide with the reference code. But the printing may be inhibited without generating an alarm signal. Also an alarm signal may be generated without inhibiting the printing operation.

In FIG. 12, another preferred continuous recording sheet 76 as a recording material is illustrated, and is provided with a positioning indicia 75. The continuous recording sheet 76 has a virtual cutting line 77, an effective printing region 78 and a reel 79. The positioning indicia 75 is used also to represent predetermined discernment information. The positioning indicia 75 is printed in the course of manufacturing the continuous recording sheet 76 in a predetermined length and shape. In the printer, the positioning indicia 75 is checked as to whether the positioning indicia 75 has the predetermined length. The printer has an indicia sensor 84, which detects edges of the positioning indicia 75 according to the sheet feeding direction. While the continuous recording sheet 76 is fed, driving pulses supplied to the stepping motor 42 are counted. The number of the pulses, in the period beginning when a front edge of the positioning indicia 75 is detected and ending when a rear edge of the positioning indicia 75 is detected, is obtained, and represents the length of the positioning indicia 75.

The length data X1, as the number of pulses representing the length, is compared with the reference data A, which is the predetermined number of pulses. If the length data X1 satisfies $$0.9A \leq X1 \leq 1.1A$$

namely if the length data X1 is in a range of ±10% of reference data A, then the continuous recording sheet 76 is detected to be usable. If the length data X1 does not satisfy the condition, the printing is inhibited, an alarm signal is generated. See FIG. 13. Note that a tolerable range of the length data X1 is ±10% of reference data A. This may be suitably modified. In the present embodiment, the length data X1 is determined by use of the number of pulses. However, other manners of representing a length of the positioning indicia 75 may be used.

It is alternatively possible that a distance between adjacent two of the positioning indicia 75 is obtained, and compared with a reference value B in consideration of a small tolerable range, so as to check acceptability of the recording material. To be precise, the distance between adjacent two positioning indicia 75 means a distance from a rear edge of a first positioning indicia 75 to a front edge of a second positioning indicia 75 succeeding to the first. Distance data Y1 of this distance is obtained as the number of driving pulses generated after detection of the rear edge of the first positioning indicia 75 at the indicia sensor 84 and before detection of the front edge of the second positioning indicia 75 at the indicia sensor 84.

The distance data Y1 of the positioning indicia 75, instead of being data of the distance, may be a pitch between adjacent two of the positioning indicia 75. For such a case, the number of the driving pulses of the stepping motor is counted in a period starting at a front edge of one of the positioning indicia 75 and ending at a front edge of a succeeding one of the positioning indicia 75, so as to obtain distance data. Furthermore, it is possible to obtain a pitch defined between rear edges of adjacent two of the positioning indicia 75, and also a pitch defined between central points of adjacent two of the positioning indicia 75.

Also, it is possible to determine discernment information as a combination of the length data X1 and the distance data Y1 of the positioning indicia 75 for the purpose of checking acceptability of the recording material. When the data X1 is in the range based on the reference value A and also when the data Y1 is in the range based on the reference value B, then the recording material is detected acceptable in view of the reference information.

In FIG. 14, still another preferred embodiment is illustrated, in which an auxiliary indicia 81 is disposed on a continuous recording sheet 82 as a recording material. Distance data Z1 between the auxiliary indicia 81 and a positioning indicia 80 is obtained for the purpose of checking acceptability of the continuous recording sheet 82. The distance data Z1, in a manner similar to the above embodiment, is obtained according to a signal detecting an edge at the indicia sensor 84, and the number of driving pulses for the stepping motor. Reference data C is predetermined. Only when the distance data Z1 is equal to the reference data C or in a predetermined tolerable range defined near to the reference data C, then the continuous recording sheet 82 is detected acceptable.

Furthermore, the distance data Z1 can be combined with the length data X1, so that their combination may be evaluated in consideration of reference information. The recording material can be checked for acceptability.

In the above embodiments, the number of driving pulses supplied for the stepping motor is counted for obtaining data X1, Y1 and Z1. Furthermore, a pulse encoder may be disposed in a manner rotatable in response to movement of the continuous recording sheet. An output of the pulse encoder may be monitored to obtain the data X1, Y1 and Z1.

According to another preferred embodiment, a width data W1 of the positioning indicia 75 (See FIG. 12) is evaluated as discernment information. For such an embodiment, a thermal printer is constructed to include a line sensor or image area sensor as the indicia sensor 84, which measures the width data W1 in addition to detection of edges of the positioning indicia 75. The printer checks whether the width data W1 is in a reference range based on a reference width, and if it is, then the recording material is detected acceptable. Note that the width data W1 can be combined with any one of the length data X1, and the distance data Y1 and Z1, so that their combination may be evaluated in consideration of reference information.

Furthermore, the shape of the positioning indicia may be predetermined and associated with information. An image area sensor can be used to recognize the shape of the positioning indicia in a manner of the pattern recognition. If the positioning indicia is detected to coincide with a reference indicia, then the continuous recording sheet can be detected acceptable. Examples of the shape of the positioning indicia is double quadrilateral frame lines, a combined shape including a dark quadrilateral and a blank quadrilateral formed therein, a combined shape including a dark quadrilateral and a blank circle therein, and a combined shape including a dark quadrilateral and a blank star polygon therein.

In the above embodiments, the positioning indicia 75 and 80 and the auxiliary indicia 81 are printed. However, such indicia may be defined by forming holes or cutouts in the recording material. Those holes and cutouts must be disposed in a peripheral region outside an effective printing region.

In the above embodiments, the positioning indicia 75 is used for checking suitability of the continuous recording sheet for the printing component. Furthermore, plural kinds of positioning indicia may be disposed, and may have a length, a width, a pitch or the like different between them. Such positioning indicia may be associated with plural predetermined recording material dealer codes or distribution channel codes for the purpose of recognizing dealers and the distribution channel or distribution routes. If some code as a part of the discernment code does not coincide with a relevant part of the reference code, then the printing is inhibited and/or an alarm signal is generated.

In the above embodiments, the discernment information of the recording material is the code. However, the discernment information may be words, phrases, letters, numbers and other readable indications. For such forms of the discernment information, a code reader may be an image area sensor or scanner.

In the above embodiments, the discernment information is prerecorded on, and read from, the recording material. However the discernment information may be derived from the recording material by any suitable manner. For example, a certain characteristic of the recording material may be directly measured or detected to derive information from the recording material.

In the above embodiments, the reference code or reference information has the same form as the discernment code or discernment information. Equality or coincidence between them is checked. However, the reference code or reference information may have a form different from that of the discernment code or discernment information, for example may have a train of decimal numbers, so that the discernment code or discernment information can be evaluated as to whether it suitably corresponds to such reference code or reference information.

In the above cash detector unit, coins or banknotes are inserted. Also a unit for automatically treating a prepaid card, a credit card or electronic money may be disposed for the purposes of payment and return of money.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A printer for recording an image on recording material, comprising:
   a first input unit for inputting discernment information of said recording material being loaded; and
   a discriminator for storing reference information representing acceptable recording material, and for checking said discernment information with reference to said reference information to judge whether said recording material is acceptable or unacceptable, wherein if said recording material is unacceptable, printing operation is inhibited and/or an alarm signal is generated.

2. A printer as defined in claim 1, further comprising:
   a pick-up unit for picking up an object to create image data;
   a printing head for printing an object image to said recording material according to said image data.

3. A printer as defined in claim 2, further comprising:
   an auxiliary image memory for storing image data of predetermined auxiliary image; and
   an image synthesis circuit for producing image data synthesized image by combining said object image with said auxiliary image, said printing head printing said synthesized image to said recording material according to said image data of said synthesized image.

4. A printer as defined in claim 1, wherein said discernment information is provided on said recording material in an externally readable manner;
   said first input unit comprises an information reader for reading said discernment information.

5. A printer as defined in claim 4, further comprising a second input unit for inputting said reference information therewith.

6. A printer as defined in claim 4, wherein said recording material includes a printing surface and a back surface, and said discernment information is disposed on said back surface.

7. A printer as defined in claim 4, wherein said recording material includes a printing surface and a back surface, said printing surface has an effective printing region and a peripheral region defined thereabout, and said discernment information is disposed in said peripheral region;
   further comprising a cutter for cutting away said peripheral region at least partially from said recording material after said printing operation, to eliminate said discernment information.

8. A printer as defined in claim 4, wherein said recording material comprises a roll recording material wound about a reel, said discernment information being indicated on an end face of said reel.

9. A printer as defined in claim 4, wherein said discernment information comprises a code for representing at least a recording material dealer of said recording material.

10. A printer as defined in claim 4, wherein said discernment information comprises a code of which at least one portion represents a recording material distribution channel of said recording material.

11. A printer as defined in claim 4, wherein said discernment information is a binary code including plural bits.

12. A printer as defined in claim 4, wherein said discernment information is constituted by a positioning indicia disposed on said recording material in a predetermined position, and adapted to recording material positioning for printing.

13. A printer as defined in claim 12, wherein said discernment information is represented by at least one of a length, a width, a shape and a pitch of said positioning indicia.

14. A printer as defined in claim 4, wherein said recording material includes:
   a positioning indicia prerecorded thereon and adapted to recording material positioning for printing;
   an auxiliary indicia prerecorded at a predetermined distance from said positioning indicia in a feeding direction of said recording material, said predetermined distance constituting said discernment information;
   wherein said first input unit including a length measurer for measuring said predetermined distance.

15. A printer as defined in claim 14, wherein said length measurer includes:
   a recording material feeder, driven in response to a driving pulse, for conveying said recording material;
   an indicia sensor for detecting said positioning indicia and said auxiliary indicia; and
   a pulse counter for counting said driving pulse between detection of said positioning indicia and detection of said auxiliary indicia to obtain said predetermined distance.

16. A printer as defined in claim 2, wherein said first input unit is externally operable, and said discernment information is input upon operation thereof.

17. A printer as defined in claim 2, wherein said discriminator is operated upon powering on.

18. A printer as defined in claim 2, further comprising a recording material sensor for detecting said recording material being loaded; and
   wherein said discriminator is operated in response to detection of new loading of said recording material at said recording material sensor.

19. A printer as defined in claim 2, wherein said recording material comprises at least first and second types of recording material;
   said printer comprising at least first and second printer units for recording to respectively said at least first and second types of said recording material.

20. A printer as defined in claim 2, further comprising a cash detector unit into which cash is externally inserted and which detects said cash;
   wherein said discriminator is operated in response to detection of said cash.

21. A printer for recording an image on recording material according to claim 1, wherein the recording material is unacceptable if the discernment information is not indicated in the reference information.

22. A printer for recording an image on recording material according to claim 1, wherein the discernment information is on a printing surface or back surface of the recording material.

23. A recording material comprising:
a printing surface and a back surface;
discernment information prerecorded on said printing surface or said back surface readably; and
wherein said recording material is judged as acceptable when said discernment information is in accordance with a reference information.

24. A recording material as defined in claim 23, wherein said discernment information is a code and includes information of a recording material dealer and/or a recording material distribution channel.

25. A recording material as defined in claim 24, wherein said discernment information further includes information of a recording material type, a recording material printing format and a recording material size.

26. A recording material as defined in claim 23, wherein said printing surface has an effective printing region and a peripheral region defined thereabout, and said discernment information is disposed in said peripheral region.

27. A recording material as defined in claim 23, wherein said discernment information is constituted by a positioning indicia disposed in a predetermined position and adapted to recording material positioning for printing.

28. A recording material as defined in claim 27, wherein said discernment information is constituted by at least one of a length, a width, a shape and a pitch of said positioning indicia.

29. A recording material as defined in claim 23, further comprising:
a positioning indicia prerecorded thereon and adapted to recording material positioning for printing; and
an auxiliary indicia prerecorded at a predetermined distance from said positioning indicia in a feeding direction of said recording material, said predetermined distance constituting said discernment information.

30. A recording material comprising:
a printing surface and a back surface;
a positioning indicia prerecorded on said printing surface or said back surface, and adapted to recording material positioning for printing, wherein at least one of a length, a width, a shape and a pitch of said positioning indicia constitutes predetermined discernment information.

31. A recording material comprising:
a printing surface and a back surface;
a positioning indicia prerecorded on said printing surface or said back surface, and adapted to recording material positioning for printing;
an auxiliary indicia prerecorded on said printing surface or said back surface at a predetermined distance away from said positioning indicia in a recording material feeding direction, said predetermined distance constituting predetermined discernment information and
wherein said recording material is judged as acceptable when said discernment information is in accordance with a reference information.

32. A printing method of recording an image on recording material, comprising steps of:
reading predetermined discernment information from said recording material, said predetermined discernment information being provided for said recording material;
predetermining reference information; and
checking said predetermined discernment information with reference to said reference information to judge whether said recording material is acceptable or unacceptable, wherein if said recording material is unacceptable, printing operation is inhibited and/or an alarm signal is generated.

33. A recording material according to claim 23, further comprising cutter lines to determine cutting away regions of said peripheral region from said recording material to eliminate the discernment information after printing.

34. A recording material according to claim 23, wherein said recording material comprises a continuous sticker.

35. A recording material according to claim 25, said recording material printing format comprises multi-frame printing wherein one common image is printed in plural regions arranged in a matrix on said recording material.

36. A recording material according to claim 23, wherein said recording material is continuous.

37. A recording material according to claim 30, wherein said recording material is continuous.

38. A recording material according to claim 31, wherein said recording material is continuous.

39. A recording material according to claim 23, wherein said recording material is thermosensitive.

40. A printer for recording an image on recording material, comprising:
a first input unit for inputting discernment information of said recording material being loaded; and
a discriminator for storing reference information representing acceptable recording material, and for checking said discernment information with reference to said reference information to judge whether said recording material is acceptable or unacceptable, wherein if said recording material is unacceptable, an alarm signal is generated.

* * * * *